(12) United States Patent
Golov

(10) Patent No.: US 12,145,604 B2
(45) Date of Patent: *Nov. 19, 2024

(54) DETERMINATION OF RELIABILITY OF VEHICLE CONTROL COMMANDS VIA REDUNDANCY

(71) Applicant: Micron Technology, Inc., Boise, ID (US)

(72) Inventor: Gil Golov, Backnang (DE)

(73) Assignee: Lodestar Licensing Group LLC, Evanston, IL (US)

(*) Notice: Subject to any disclaimer, the term of this patent is extended or adjusted under 35 U.S.C. 154(b) by 532 days.

This patent is subject to a terminal disclaimer.

(21) Appl. No.: 17/089,099

(22) Filed: Nov. 4, 2020

(65) Prior Publication Data

US 2021/0046944 A1 Feb. 18, 2021

Related U.S. Application Data

(63) Continuation of application No. 15/855,451, filed on Dec. 27, 2017, now Pat. No. 10,836,402.

(51) Int. Cl.
*B60W 50/02* (2012.01)
*B60W 50/023* (2012.01)
*G05D 1/00* (2024.01)

(52) U.S. Cl.
CPC ...... *B60W 50/0205* (2013.01); *B60W 50/023* (2013.01); *G05D 1/0088* (2013.01);
(Continued)

(58) Field of Classification Search
CPC .......... B60W 50/0205; B60W 50/023; B60W 2050/021; B60W 2050/0215; G05D 1/0088
See application file for complete search history.

(56) References Cited

U.S. PATENT DOCUMENTS 6,108,598 A   8/2000 Sumitani
8,145,822 B2  3/2012 Hachmann et al.
(Continued)

OTHER PUBLICATIONS

Backhausen et al.; Robustness in Automotive Electronics: an industrial overview of major concerns; 2017 IEEE 23rd Intl. Sym. on On-Line Testing and Robust System Design (IOLTS); Thessaloniki, Greece; 2017; pp. 157-162 (Year: 2017).*

(Continued)

*Primary Examiner* — Michael J Zanelli
(74) *Attorney, Agent, or Firm* — Greenberg Traurig

(57) ABSTRACT

A vehicle having a control element for the speed, acceleration or direction of the vehicle, two identical or redundant computing devices (e.g., each implemented as a system on chip (SoC)) to separately generate driving commands in parallel during autonomous driving of the vehicle, and a command controller coupled between the control element and the computing devices. In response to the commands from the identical or redundant computing devices, the command controller determines whether the commands are identical (or agree with each other); and if so, the command controller forwards one of the commands to the control element for execution. When there is a mismatch in the commands from the computing devices, the command controller tests the memories of the computing devices to identify a faulty one of the computing devices.

20 Claims, 6 Drawing Sheets

(52) U.S. Cl.
CPC ............... *B60W 2050/021* (2013.01); *B60W 2050/0215* (2013.01)

(56) References Cited

U.S. PATENT DOCUMENTS

| | | |
|---|---|---|
| 8,601,321 B2 | 12/2013 | Feng |
| 9,331,989 B2 | 5/2016 | Dover |
| 9,502,128 B2 | 11/2016 | Lee |
| 9,533,579 B2 | 1/2017 | Nomura |
| 9,569,622 B2 | 2/2017 | Dover |
| 9,613,214 B2 | 4/2017 | Dover |
| 10,431,299 B2 | 10/2019 | Tokutomi et al. |
| 10,836,402 B2 | 11/2020 | Golov |
| 2009/0210777 A1 | 8/2009 | Weiberle et al. |
| 2014/0140135 A1 | 5/2014 | Okano et al. |
| 2014/0208151 A1 | 7/2014 | Fernandez |
| 2014/0229724 A1 | 8/2014 | Chen et al. |
| 2015/0094899 A1 | 4/2015 | Hackenberg et al. |
| 2015/0280919 A1 | 10/2015 | Cullen et al. |
| 2015/0331055 A1 | 11/2015 | Yuhei et al. |
| 2016/0162422 A1 | 6/2016 | Weber |
| 2017/0075352 A1 | 3/2017 | Nordbruch |
| 2017/0090476 A1* | 3/2017 | Letwin .............. G05D 1/0212 |
| 2017/0300052 A1 | 10/2017 | Harda et al. |
| 2018/0039538 A1 | 2/2018 | Freikorn et al. |
| 2018/0074718 A1 | 3/2018 | Lee |
| 2018/0203622 A1 | 7/2018 | Ishiguro |
| 2019/0163367 A1 | 5/2019 | Bazarsky et al. |
| 2019/0180526 A1* | 6/2019 | Mehdizade .......... G05D 1/0088 |
| 2019/0193745 A1 | 6/2019 | Golov |
| 2019/0193746 A1 | 6/2019 | Golov |
| 2019/0193747 A1 | 6/2019 | Golov |
| 2020/0125441 A1* | 4/2020 | Omori .................... B60R 16/02 |
| 2020/0142472 A1 | 5/2020 | Golov |
| 2020/0151067 A1 | 5/2020 | Golov |

OTHER PUBLICATIONS

Humphry et al.; A Fault-Tolerant/Fail-Safe Command and Control System for Automated Vehicles; 32nd IEEE Vehicular Tech. Conf.; San Diego, CA; 1982; pp. 420-426 (Year: 1982).*

International Search Report and Written Opinion, Int. App. No. PCT/US2018/052634, mailed Jan. 20, 2019.

International Search Report and Written Opinion, PCT/US2019/058936, mailed Feb. 21, 2020.

P. Balasubramanian et al., "A Fault Tolerance Improved Majority Voter for TMR System Architectures", WSEAS Transactions on Circuits and Systems, vol. 15, 2016, pp. 108-122.

RAID, https://en.wikipedia.org/wiki/RAID, printed on Oct. 25, 2018, 11 pages.

Sandeep Kaushik, Yervant Zorian, "Embedded memory test and repair optimizes SoC yields", Jul. 17, 2012.

* cited by examiner

DETERMINATION OF RELIABILITY OF VEHICLE CONTROL COMMANDS VIA REDUNDANCY

RELATED APPLICATIONS

The present application is a continuation application of U.S. patent application Ser. No. 15/855,451, filed Dec. 27, 2017, issued as U.S. Pat. No. 10,836,402 on Nov. 17, 2020, and entitled "Determination of Reliability of Vehicle Control Commands via Redundancy", the entire disclosure of which application is hereby incorporated herein by reference.

The present application is related to U.S. patent application Ser. No. 15/855,175, filed on Dec. 27, 2017, published as U.S. Pat. App. Pub. No. 2019/0193745 on Jun. 27, 2019, and entitled "Determination of Reliability of Vehicle Control Commands via Memory Test", the entire disclosure of which application is hereby incorporated herein by reference.

FIELD OF THE TECHNOLOGY

At least some embodiments disclosed herein relates to vehicle control in general and more particularly, but not limited to, the reliability of commands generated by computing devices for autonomous control of vehicles.

BACKGROUND

Recent developments in the technological area of autonomous driving allow a computing system to operate, at least under some conditions, control elements of a vehicle without the assistance from a human operator of the vehicle.

For example, sensors (e.g., cameras and radars) can be installed on a vehicle to detect the conditions of the surroundings of the vehicle on a roadway. A computing system installed on the vehicle analyzes the sensor inputs to identify the conditions and generate control signals or commands for the autonomous adjustments of the direction and/or speed of the vehicle, without any input from a human operator of the vehicle.

In some arrangements, when a computing system recognizes a situation where the computing system may not be able to continue operating the vehicle in a safe manner, the computing system alerts the human operator of the vehicle and requests the human operator to take over the control of the vehicle and drive manually, instead of allowing the computing system to drive the vehicle autonomously.

U.S. Pat. App. Pub. No. 2015/0094899, entitled "Method for Driver Assistance System of a Vehicle" and published on Apr. 2, 2015, discloses a method to alert a driver to take control of the vehicle, when the distance between the current location of the vehicle and an end of a route section that has been identified for driving by the computing system is shorter than a threshold. U.S. Pat. App. Pub. No. 2017/0300052, entitled "Handover Notification Arrangement, a Vehicle and a Method of Providing a Handover Notification" discloses a further technique to hand over the control of the vehicle back to a human driver.

U.S. Pat. No. 9,533,579, entitled "Electronic Control Apparatus for Electrically-Driven Vehicle" and published Jan. 3, 2017, discloses an electronic control apparatus of a vehicle that has a self-diagnosis function.

U.S. Pat. No. 8,601,321, entitled "System-on-a-Chip (SoC) Test Interface Security" and published Dec. 3, 2013, discloses a System on Chip (SoC) that, during a time to boot up its processor, reads a memory area storing a scrambled portion of firmware to create a descrambled value for a determination of whether a test interface to access the processor by an external device is authorized.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
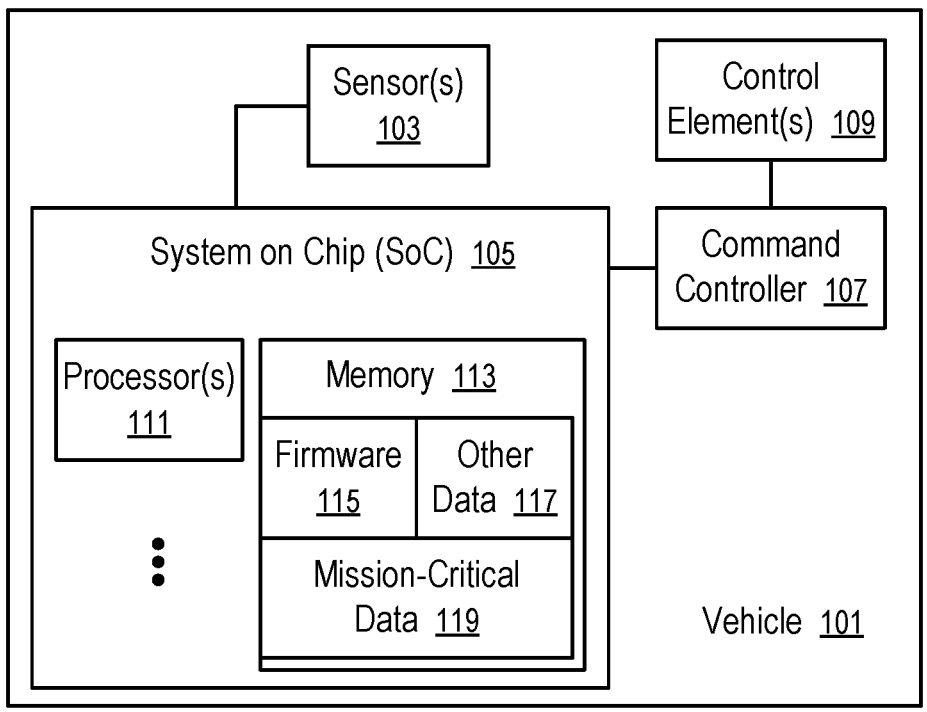
FIG. 1 shows a vehicle having a command controller according to one embodiment.

At least some embodiments disclosed herein provide a command controller that determines the reliability of a command generated by a computing device for the autonomous driving of a vehicle by testing a portion of the memory of the computing device. The command controller blocks the command and/or initiates an emergency response when the computing device fails the memory test.

To reduce the amount of memory tests performed during the autonomous driving of the vehicle, the vehicle may optionally be configured to have identical or redundant computing devices that operate on the same input data to generate redundant driving commands. The command controller inspects the commands received from the redundant computing devices to determine whether they agree with each other; and if so, the command controller assumes that the commands are reliable, skips the memory test, and allows the execution of one of the commands that match with each other. However, when there is a mismatch in the commands generated by the redundant computing devices, the command controller tests portions of the memories of the computing devices to identify an unreliable command generated by a faulty one of the computing devices. The unreliable command is filtered out and/or discarded. Optionally, the command controller may use the data in the healthy one of the redundant computing devices to repair the computing function of the faulty one of the computing devices.

For example, when a vehicle uses a system on chip (SoC) to generate a command for an autonomous operation of a vehicle (e.g., steering the wheels of the vehicle, adjusting the speed of a motor of the vehicle, activating the brakes of the vehicle), the command controller determines whether the command can be trusted based on a determination of whether the SoC is damaged. If the SoC is damaged in part, the command generated by SoC is considered unreliable and thus can be blocked for an emergency response.

The health of the memory the SoC may be considered the proxy of the health of the SoC as a whole. When certain areas of the memory of the SoC are damaged, especially the mission critical portions of the memory, the reliability of the SoC in generating commands for autonomous driving is considered compromised. Thus, when the SoC fails a test of a mission critical part of its memory, the command generated by the SoC for autonomous driving may be blocked; and one or more safe-mode commands may be generated to place the vehicle in a safe condition.

For example, a command controller can be configured on a command communication path from the SoC to a control element that effectuates a command from the SoC. The command controller is configured to intercept the command that is issued by the SoC and that affects the operation of the control element of the vehicle. In some instances, the command is directly executed by the control element; and in other instances, the command is further processed by another computing device (e.g., another SoC) to generate control signals or commands for the control element.

In response to intercepting the command from the SoC to the control element, the command controller initiates a memory test on the SoC, preferably testing one or more mission sensitive or critical areas of the memory of the SoC, such as a memory area that stores the software/firmware used for the generation of the command, a memory area that stores the data based on which the command is generated.

If the SoC passes the test of selected areas of its memory, the controller provides the intercepted command to the vehicle for execution or effectuating by the control element; otherwise, the SoC may be considered defective, which causes the command controller to identify the command as being generated in error and prevent the command from reaching the control element, and/or causes the command controller to generate one or more basic replacement commands to place the vehicle in a safe condition.

For example, in response to the SoC failing a memory test, the command controller may request a human operator of the vehicle to take over the control of the vehicle, communicate with a remote server to obtain a replacement command if a suitable communication channel is available, activate an emergency signal of the vehicle, activate a predetermined emergency command or routine for operating the vehicle under emergency conditions (e.g., slowing down the vehicle for a stop).

In some implementations, the command controller is implemented using a computing device external to the SoC using hardware. Preferably, the hardware of the command controller is more reliable and/or durable than the SoC. Alternatively, the command controller may be implemented as part of the SoC in controlling its output using a dedicated hardware circuitry and/or firmware.

FIG. 1 shows a vehicle (101) having a command controller (107), a system on chip (SoC) (105), one or more sensors (103), and one or more control elements (109).

In FIG. 1, the System on Chip (SoC) (105) has memory (113) and one or more processors (111); and the command controller (107) is coupled between the SoC (105) and the controller element(s) (109) to prevent commands generated by the SoC (105) from reaching the control element(s) (109) when the commands are determined to be unreliable.

In general, the command controller (107) may a self-diagnosis function to evaluate the health state of the SoC (105), including the memory (113) and the processors (111).

The result of the self-diagnosis function may be used to determine the reliability of the commands generated by the SoC (105). Preferably, the reliability of the commands or outputs of the SoC (105) is tested (e.g., on a per command basis, or periodically) in real time during autonomous driving based at least in part on the results of testing one or more selected portions of the memory (113).

The SoC (105) of FIG. 1 receives data from the sensor(s) (103) and executes, using its processor(s) (111), firmware (115) stored in the memory (113) to generate commands affecting the control element(s) (109) that can effectuate the autonomous driving of the vehicle (101). For example, the sensor(s) (103) may include a visible light camera, an infrared radiation camera, a lidar (Light Detection And Ranging), a radar (RAdio Detection And Ranging), etc.

The processor(s) (111) and the memory (113) of the SoC (105) are typically sealed inside a same integrated circuitry package. However, the processor(s) (111) and the memory (113) may or may not be formed on a single silicon substrate.

When the SoC (105) has a damaged circuitry (e.g., processor(s) (111)), it is likely that the memory (113) of the SoC (105) is also damaged. When a portion of the memory (113) storing the firmware (115) and/or mission-critical data (119) for the execution of the firmware (115) is determined to be damaged after the generation of a command, it is likely that the command is an erroneous result of the execution of the firmware (115). Thus, the memory testing result of the SoC (105) can be used as a proxy indicator of the health of the SoC (105) and be assessed in real time during autonomous driving.

In general, the SoC (105) may also receive inputs from other computing devices (not shown in FIG. 1) that are configured on the vehicle (101), such as an input or a command from another SoC that provides a prepossessing result of the sensor(s) (103) or another sensor (not shown in FIG. 1).

Similarly, the command or output generated by the SoC (105) may also be used as an input to other computing devices, such as another SoC, which post-processes the command or output of the SoC (105) to drive the control element(s) (109).

For example, the vehicle (101) may be configured as a car or automobile driven by an electric motor or an internal combustion engine. The control element(s) (109) may include a brake of the vehicle (101), an acceleration control of the vehicle (101), a steering control of the vehicle (101), a turn signal of the vehicle control (101), etc.

For improved reliability, the testing of the health of the SoC (105) is performed in real time in response to the command or output generated by the SoC (105), especially when the command or output has an impact on the operation of the control element(s) (109).

Performing a complete diagnosis of the SoC (105) may be time consuming and, if performed on a per command basis, may cause unacceptable delay in providing the command/output from the SoC (105) to the control element(s) (109). Optionally, a complete diagnosis of the SoC (105) may be performed during certain time periods (e.g., when the vehicle (101) is in a parking mode, during the startup of the vehicle) but not performed during the time period of active driving to avoid interference with the autonomous driving function of the SoC (105).

Preferably, the command controller (107) initiates a test of a mission critical portion of the memory (113) to balance the need for reliability check in the commands/outputs from the SoC (105) and the need to avoid excessive delay in the propagation of the commands/outputs from the SoC (105) to the control element(s) (109).

The mission critical portion of the memory (113) may include the portion storing the firmware (115) for instructing the processor(s) (111) to perform computations that result in the generation the commands/outputs of the SoC (105) and/or the portion of the memory (113) that stores the mission-critical data (119) used in generation of the commands/outputs of the SoC (105). Examples of the mission-critical data (119) include the synaptic weights of an artificial neural network for the recognition of an event or object captured by the sensor(s) (103) and/or for the generation of the driving decision responsive to the recognition of the event or object.

The memory (113) may include a portion that stores other data (117) that are not used to generate the commands/outputs of the SoC (105) and/or a portion that does not currently store any valid data when the SoC (105) outputs its command or control signals. The command controller (107) may skip the testing of such a portion of the memory (113) of the SoC (105).

The mission critical portion of the memory (113) may be are predefined. For example, the modules of a firmware (115) and the mission-critical data (119) for the generation of one command may be configured to be stored in a predefined area of the memory (113). The predefined area may be identified by one or more blocks of physical addresses or logical addresses. In response to the detection of a command in the output of the SoC (105), the predefined area of the memory (113) is tested as a proxy of the health of the SoC (105). The mission critical portion of the memory (113) may be selected based on the type of the commands/outputs generated by the SoC (105), in accordance with the identification of modules and data items responsible for the generation of the type of the commands/outputs.

Alternatively or in combination, a randomly selected portion of the memory (113) may be tested, where the test result is used as a health proxy of the SoC (105) as a whole.

The SoC (105) is optionally configured with a circuit for self-testing a portion of its memory (113). The circuit is activated by the command controller (107) to generate a test result in response to a command/output being generated by the SoC (105). In some instances, the function of the self-testing circuit is alternatively implemented by, at least in part, the processor(s) (111) executing a module of the firmware (115).

Alternatively, the command controller (107) may communicate through a test interface of the SoC (105) to access the memory (113) to perform the test of a selected portion of the memory (113) of the SoC (105).

In some instances, the function of the system on chip (105) is not implemented in a single integrated circuit chip. For example, more than one integrated circuit chip may be used to implement the function of the SoC (105) illustrated in FIG. 1. When the components for implementing the function of the system on chip (105) are located close to each other, the memory test can also be used to indicate the health of the components as a whole.

In some instances, the command controller (107) is implemented as a system on chip or an on-board computer of the vehicle (101). Alternatively, the command controller (107) may be integrated within the SoC (105).

Figure 2:
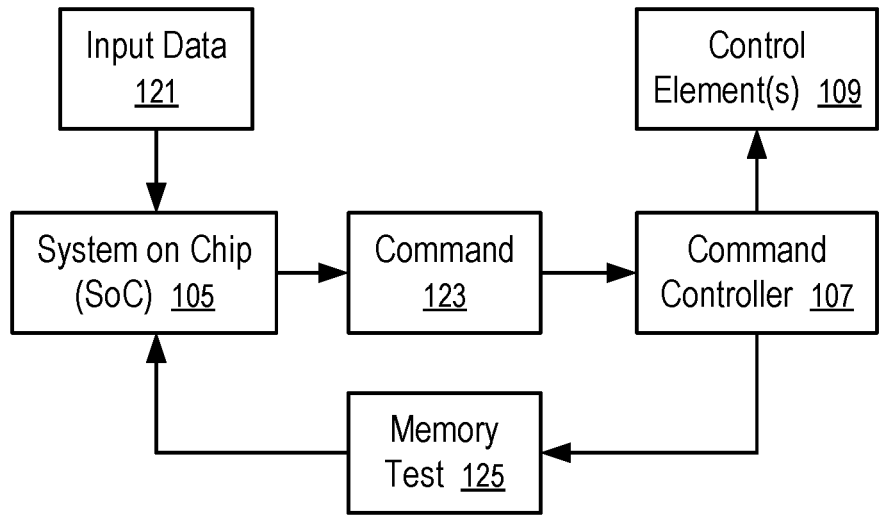
FIG. 2 illustrates the operations of a command controller to check the reliability of commands from a computing device of a vehicle according to one embodiment.

FIG. 2 illustrates the operations of a command controller to check the reliability of commands from a computing device of a vehicle according to one embodiment. For example, the operations illustrated in FIG. 2 can be implemented in a vehicle (101) illustrated in FIG. 1 or in another system.

In FIG. 2, the SOC (105) receives input data (121) to generate a command (123) that affects or controls the operation of the control element(s) (109).

The command controller (107) intercepts the command (123) on the communication path from the SoC (105) to the control element(s) (109).

In response to such a command (123), the command controller (107) generates or initiates a memory test (125).

In some implementations, the memory test (125) is for a predetermined area of the memory (113) of the SoC (105), independent on the command (123).

In other implementations, the command controller (107) selects the area of the memory (113) for the memory test (125) based on the content of the command (123).

For example, based on a type of the command (123), the command controller (107) identifies the modules of the firmware (115) that are used for the generation of the command (123) and performs, or requests, the memory test (125) of the portion of the memory (113) that stores the identified modules of the firmware (115).

For example, based on a type of the command (123), the command controller (107) identifies the data components (e.g., 119) that are used for the generation of the command (123) and performs, or requests, the memory test (125) of the portion of the memory (113) that stores the identified data components (115).

In some instances, the firmware (115) and/or the mission-critical data (119) are stored with redundancy and/or parity data that enables the testing of the health of the portion(s) of the memory (113) storing the firmware (115) and/or the data (119), without performing write operations in the tested portion(s) of the memory (113) of the SoC (105).

Figure 3:
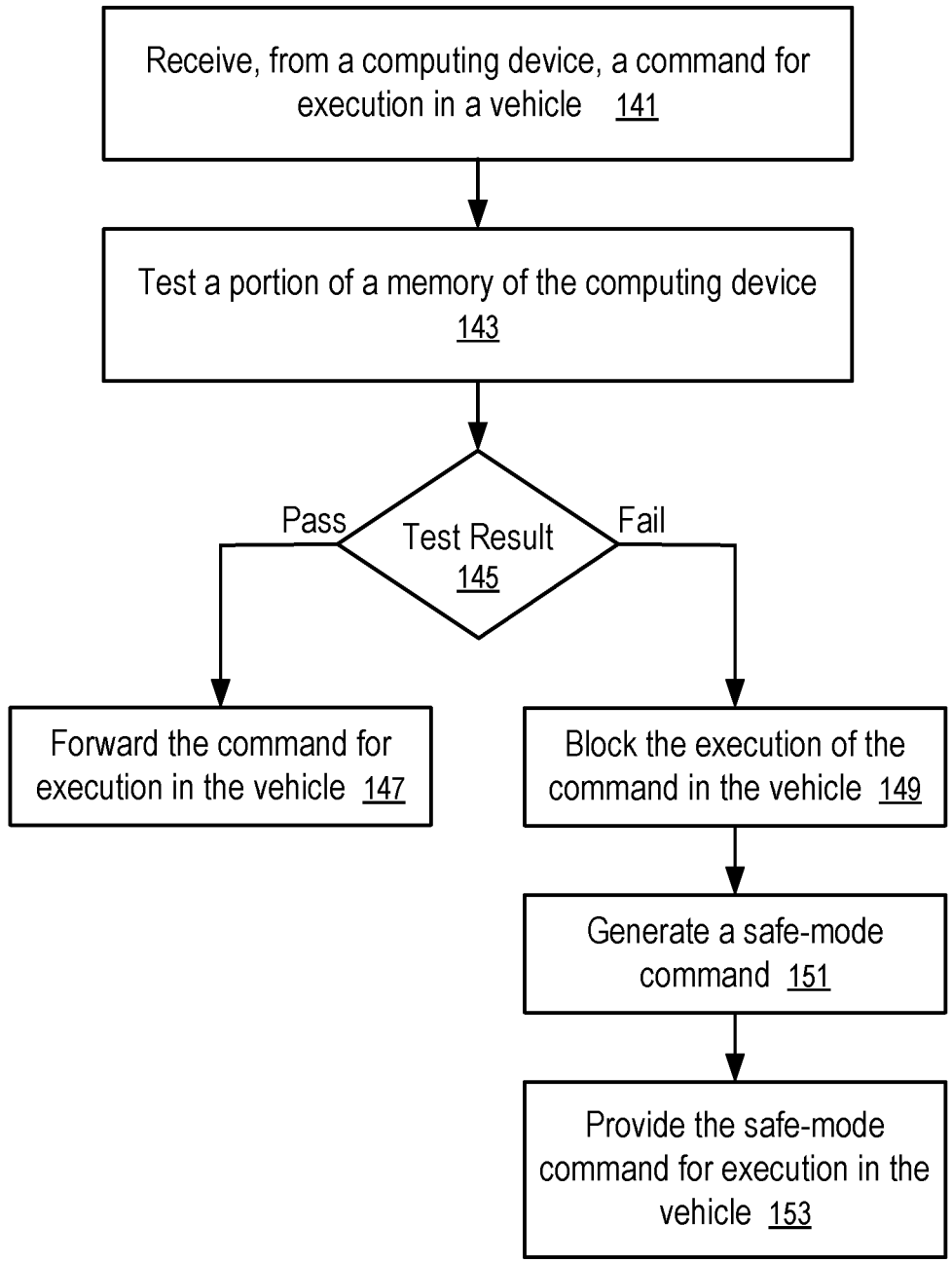
FIG. 3 shows a method to process a command from a computing device of a vehicle according to one embodiment.

FIG. 3 shows a method to process a command from a computing device of a vehicle according to one embodiment. For example, the method of FIG. 3 can be implemented in the vehicle (101) of FIG. 1 to perform operations illustrated in FIG. 2.

The method of FIG. 3 includes: receiving (141), from a computing device (e.g., SoC (105)), a command (123) for execution in a vehicle (101); testing (143) a portion (e.g., 115 and 119) of a memory (113) of the computing device (e.g., SoC (105)); determining (145) from the test result whether the memory (113) of the computing device (e.g., SoC (105) has passed the test (125) or failed the test (125); and, if it is determined (145) that the memory (113) has passed the test (125), forwarding (147) the command (123) for execution in the vehicle (101).

If it is determined (145) that the memory (113) has failed the test (125), the method of FIG. 3 further includes: blocking (149) the execution of the command (123) in the vehicle (101); generating (151) a safe-mode command; and providing (153) the safe-mode command for execution in the vehicle (101).

Figure 4:
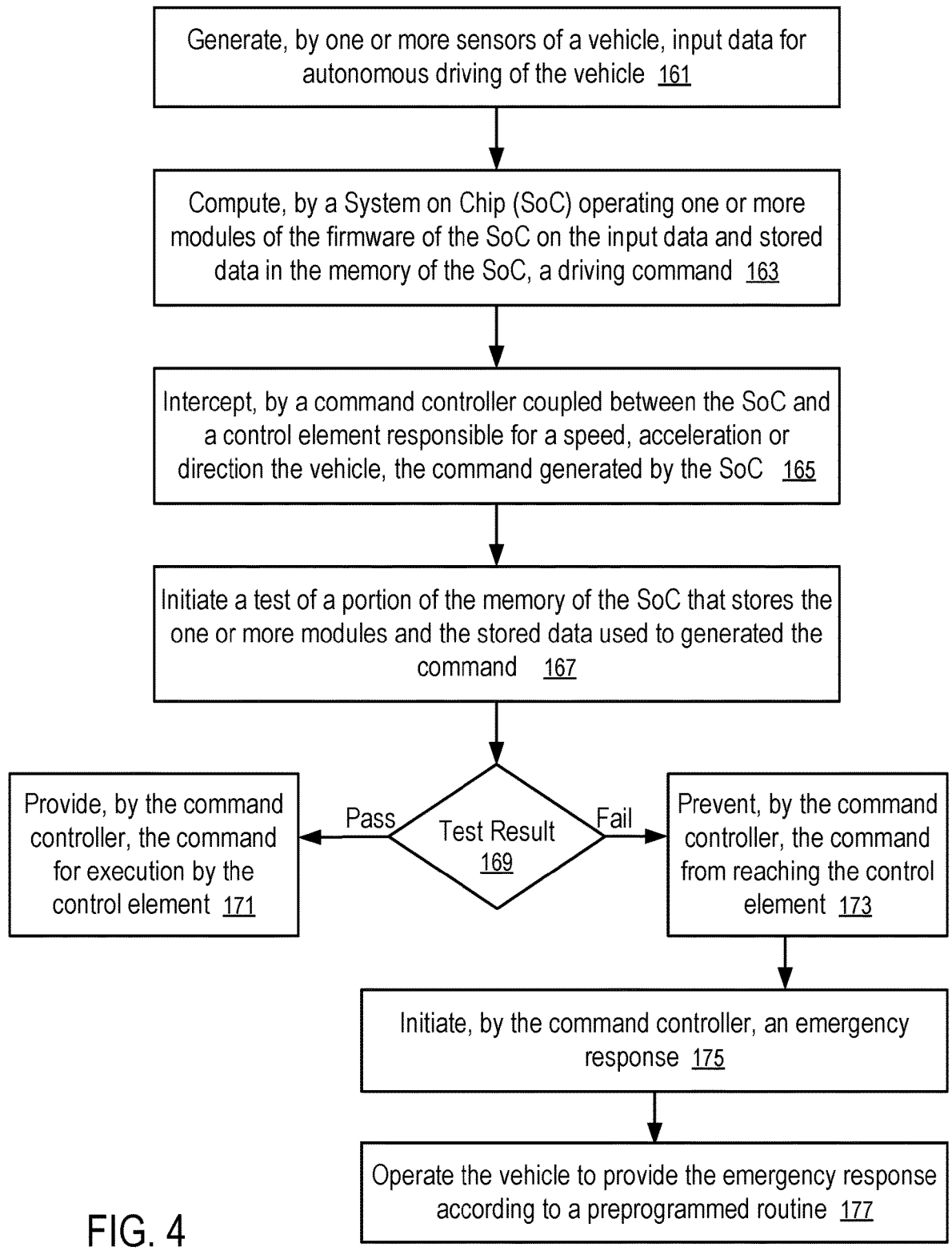
FIG. 4 shows a detailed method to enhance the reliability of a vehicle having an autonomous driving function according to one embodiment.

FIG. 4 shows a detailed method to enhance the reliability of a vehicle having an autonomous driving function according to one embodiment. For example, the method of FIG. 4 can be implemented in the vehicle (101) of FIG. 1 to perform operations illustrated in FIG. 2.

The method of FIG. 4 includes: generating (161), by one or more sensors (103) of a vehicle (101) (e.g., a visible light camera, an infrared camera, a sonar, a radar, a lidar), input data (121) for/during autonomous driving of the vehicle (101); computing (163), by a System on Chip (SoC) (105) operating one or more modules of the firmware (115) of the SoC (105) on the input data (121) and stored data (119) in the memory (113) of the SoC (105), a driving command (123); intercepting (165), by a command controller (107) coupled between the SoC (105) and a control element (109) responsible for a speed, acceleration or direction the vehicle (101) (e.g., an accelerator, a brake, a steering mechanism of the vehicle), the command (123) generated by the SoC (105); initiating (167) a test (125) of a portion of the memory (113) of the SoC (105) that stores the one or more modules and the stored data (119) used to generated the command (123); determining (145) from the test result whether the portion of the memory (113) of the computing device (e.g., SoC (105) has passed the test (125) or failed the test (125); and, if the portion of the memory (113) of the computing device (e.g., SoC (105) has passed the test (125), providing (171), by the command controller (107), the command (123) for execution by the control element (109).

If the portion of the memory (113) of the computing device (e.g., SoC (105) has failed the test (125), the method of FIG. 4 further includes: preventing (173), by the command controller (107), the command (123) from reaching the control element (109); initiating (175), by the command controller (107), an emergency response; and operating (177) the vehicle (101) to provide the emergency response according to a preprogrammed routine.

For example, the emergency response may include: requesting a human operator of the vehicle (101) to take control of the vehicle (101); starting a preprogrammed emergency response routine to place the vehicle (101) in a safe condition; and/or reducing the speed of the vehicle (101) for a stop.

In some instances, the portion of the memory (113) that is being tested (125) is identified based on a type of the command (123). Based on the type of the command (123), the command controller (107) and/or the SoC (105) identifies the modules of the firmware (115) responsible for outputting the command (123) and its associated data (119) responsible for outputting the command (123). The portion of the memory (113) being tested is identified to exclude, from the test (125), a portion of the memory (113) that is not used, or stores other data (117) that are not responsible for outputting the command (123), or stores other modules of the firmware (115) that are not responsible for outputting the command (123).

In some implementations, the command controller (107) is external to the SoC (105) that is sealed in an integrated circuit package. Alternatively, the command controller (107) may be part of the SoC (105), implemented via the processor(s) (111) executing a module of the firmware (115) and/or implemented via a hardware circuitry.

The SoC (105) may include a memory test circuitry that performs the test (125) in response to a request from the command controller (107).

In some instances, it is desirable to reduce the number of memory tests performed during the autonomous driving of the vehicle. The memory tests can be reduced via implementing redundancy in the generation of the commands for autonomous driving such that, when possible, the reliability of the autonomous driving commands is assessed based on redundancy, instead of memory tests.

For example, at least two identical SoCs (e.g., 105) can be used to process the same input data (103) to generate redundant ones of the command (123) for autonomous driving of the vehicle (101). The use of the redundant components in the vehicle (101) improves reliability of the vehicle (101) as a whole. The reliability of a command (123) generated by one SoC (105) may be examined by comparing it to the redundant command generated by another redundant SoC that is identical to the SoC (105) and that operates on the same input data (121) from the sensor(s) (103). When the commands match with each other, the command (123) generated by the SoC (105) is considered to be reliable; and thus, the command controller (107) can forward the command (123) to be executed and/or effectuated by the control element(s) (109) without the need for a memory test for the determination of the reliability of the command (123).

Typically, redundant components do not fail at the same time and/or fail in the same way. Thus, when the redundant components generate different results from the same input (121), the mismatched results are the indication of a fault, error, problem, corruption, or failure in at least one of the redundant components, which produces an unreliable result. To identify the unreliable one of the different results and/or the faulty component, a memory test (125) can be performed as discussed above in connection FIG. 2 for each of the redundant components. The redundant components can be tested in parallel. After eliminating the unreliable result generated by the faulty component, the vehicle is most likely to be still operable using one of the redundant components that is still healthy, as indicated by passing a memory test (e.g., 125). In a rare event where all of the redundant components fail their memory tests (e.g., 125), or when the memory tests (e.g., 125) fail to positively identify a faulty component, an emergency response or safe-mode command can be initiated by the command controller (107) in a way similar to those discussed above in connection with FIGS. 1-4.

Figure 5:
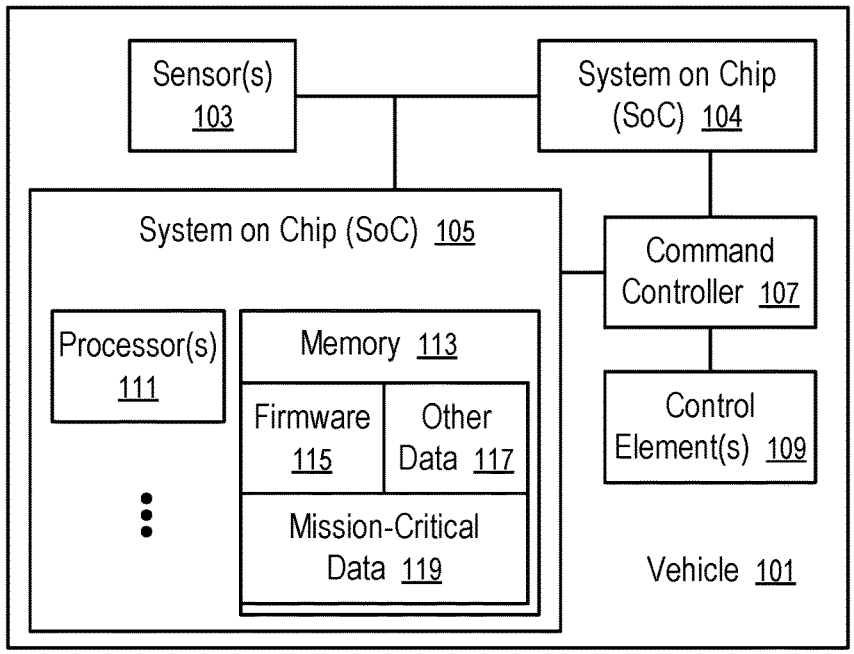
FIG. 5 shows a vehicle having redundant SoCs for generating autonomous driving commands according to one embodiment.

FIG. 5 shows a vehicle having redundant SoCs for generating autonomous driving commands according to one embodiment. For example, the vehicle (101) of FIG. 5 can be implemented by adding, in the vehicle (101) of FIG. 1, a SoC (104) that is identical to the SoC (105), or having the same function in generating a driving command for the command controller (107).

When the vehicle (101) of FIG. 5 has redundant components (104 and 105), the use of the redundant components (104 and 105) improves the reliability of the vehicle (101) as a whole. For example, if one of the SoCs (104 and 105) fails completely (e.g., no longer generating outputs to the command controller (107)), the autonomous driving of the vehicle (101) can still function as intended using the remaining one of the SoCs (104 or 105).

In FIG. 5, both SoCs (104 and 105) receive the same input data from the sensor(s) (103) and be configured to process the input data in the same way, by the processor(s) (111) running the relevant modules of the firmware (115) in accordance with the mission-critical data (119) to process the inputs from the sensor(s) (103). When both SoCs (104 and 105) are healthy, the SoCs (104 and 105) produce identical, or substantially the same, outputs to the command controller (107).

When the SoCs (104 and 105) produce the same output to the command controller (107), it can be assumed that both SoCs (104 and 105) are healthy and the outputs of the SoCs (104 and 105) are reliable. As a result, the command controller (107) can skip memory tests that are designed to test the reliability of the outputs of the SoCs (104 and 105).

However, one of the SoCs (104 and 105) may have a fault, error, problem, corruption, or failure that causes the faulty SoCs (104 or 105) to generate an unreliable, faulty, or erroneous output. When the outputs of the SoC (104 and 105) are different, it can be inferred that at least one of the SoC (104 and 105) is defective.

In some instances, it may be possible for the command controller (107) to determine which of the SoCs (104 and 105) is defective based on examining the outputs generated by the SoCs (104 and 105).

For example, when one of the SoCs (104 and 105) fails to provide an output, the SoC (104 or 105) that fails to generate an output is defective.

For example, when one of the SoCs (104 and 105) provides an output that is out of an expected range, the SoC (104 or 105) that generates the out of range output is defective.

For example, in view of the previous outputs, when one of the SoCs (104 and 105) provides an output that does not agree with a predetermined pattern, the SoC (104 or 105) generating the output that is in conflict with the predetermined pattern is defective.

However, in many instances, the command controller (107) may not be able to tell which of the SoC (104 and 105) is defective, based on the analyses of the outputs of the SoCs (104 and 105). In other instances, detailed analyses of the outputs of the SoCs (104 and 105) to identify a faulty one within the outputs may take a time period longer a threshold safe for autonomous driving and/or longer than the time period for performing a memory test.

Thus, when the command controller (107) receives different commands or control signals from the SoCs (104 and 105), the command controller (107) may initiate memory tests on both SoCs (104 and 105) in parallel to identify one of the SoCs (104 and 105) that has faulty memory (e.g., 113) that is responsible, at least in part, for the generation of a corresponding faulty command or control signal.

The memory test performed on each of the SoCs (104 and 105) is configured to determine the reliability of the respective SoC (104 or 105). If the SoC (104 or 105) fails the memory test, its output to the command controller (107) is unreliable and thus can be discarded.

The command controller (107) may perform the same memory test on both SoCs (104 and 105). For example, the command controller (107) may test selected memory blocks having the same physical addresses (or logical addresses) within the SoCs (104 and 105), regardless of whether the tested memory blocks are configured to store the same content. For example, the command controller (107) may test selected memory blocks that store the same content (e.g., same modules of the firmware (115) and same mission-critical data (119)) within the SoCs (104 and 105), even though the memory blocks corresponding to different physical and/or logical addresses within the different SoCs (104 and 105).

Alternatively, the command controller (107) may test the SoCs (104 and 105) differently. For example, the command controller may randomly select a portion of the memory (113) of the SoC (105) for testing and randomly selection another portion of the memory of SoC (104) (104) for testing, where the selected memory portions of the SoCs (104 and 105) may have not any apparent relations. In some instances, the command controller (107) may randomly test portions of the memories of the SoCs (104 and 105) until one of the SoCs (104 and 105) fails its test, or entire memories of the SoCs (104 and 105) pass their tests.

Optionally, the SoCs (104 and 105) are identical in hardware and in stored content. For example, the SoCs (104 and 105) not only store the same firmware (115) at the same location within their memories (e.g., 113), but also store the same mission-critical data (119) at the same location within their memories (e.g., 113). When healthy, the SoCs (104 and 105) may be indistinguishable from each other and are interchangeable.

Alternatively, the usage of the SoCs (104 and 105) in the vehicle may be different in some aspects. For example, the memories (e.g., 113) of the different SoCs (104 and 105) may be used to store different other data (117). For example, the firmware (115) and/or the mission-critical data (119) may be stored at different locations within the memories (e.g., 113) of the different SoCs (104 and 105).

In some implementations, the SoCs (104 and 105) may not be identical in hardware. For example, aside from the SoCs (104 and 105) being configured to produce the same output for the command controller (107) based on the same input from the sensor(s) (103), the SoC (104 and 105) may have other functions. For example, the SoC (104 and 105) may have different circuits for their identification. For example, the SoC (104) may include a self-diagnosis circuitry or module which is absent from the SoC (105). For example, the SoCs (104 and 105) may have different implementations resulting in different trade-offs in hardware cost and performance (e.g., in computation speed, durability, reliability). For example, the SoC (104) is configured to provide a redundant function of the SoC (105) in generating outputs to the command controller (107) but may have other functions not found in SoC (105) and may not have some functions found in SoC (105).

Figure 6:
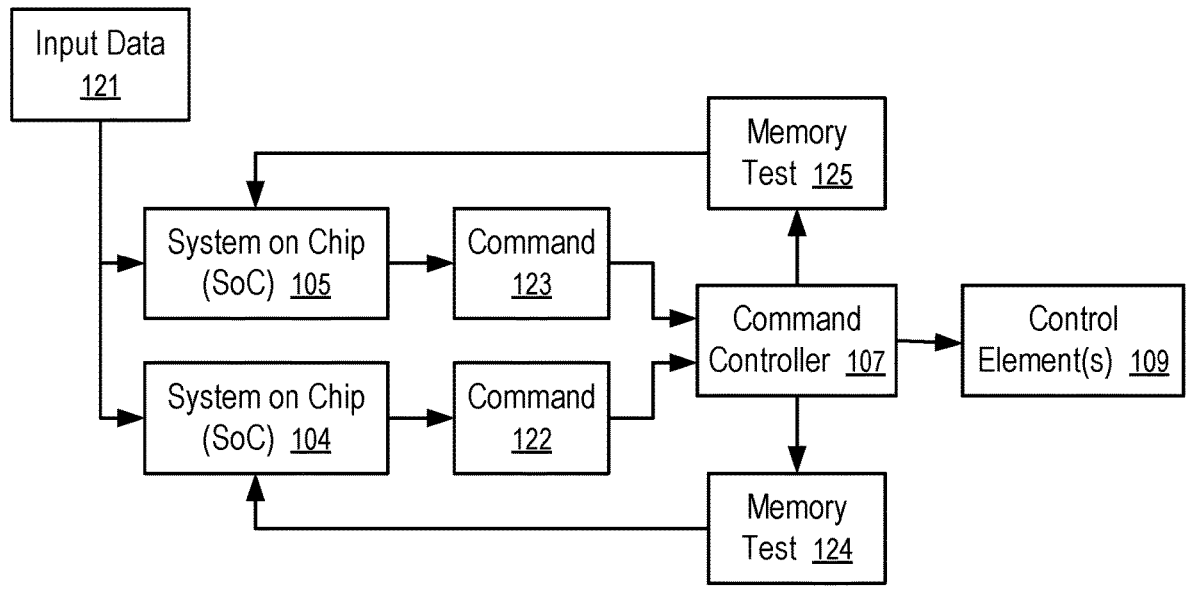
FIG. 6 illustrates the operations of a command controller to check the reliability of commands from redundant computing devices of a vehicle according to one embodiment.

FIG. 6 illustrates the operations of a command controller to check the reliability of commands from redundant computing devices of a vehicle according to one embodiment. For example, the operations illustrated in FIG. 6 can be implemented in a vehicle (101) illustrated in FIG. 5 or in another system.

In FIG. 6, both the SoCs (104 and 105) receives the same input data (121) to generate respective commands (122 and 123) that affect or control the operation of the control element(s) (109) for the autonomous driving of the vehicle (101).

The command controller (107) intercepts the commands (122 and 123) on the communication path from the SoCs (104 and 105) to the control element(s) (109).

In response to such commands (122 and 123), the command controller (107) compare the commands (122 and 123).

If the commands (122 and 123) are the same, or have a parameter difference that is less than a predetermined threshold, the command controller (107) skips memory tests (124 and 125) that are designed to test the reliability of the commands (122 and 123). The match in the commands (122 and 123) is considered an indication of reliability of both of the commands (122 and 123).

If the commands (122 and 123) are different, or have a parameter difference that is more than the predetermined threshold, the command controller (107) generates, initiates, or requests the memory tests (124 and 125) that are designed to test the reliability of the commands (122 and 123). The mismatch in the commands (122 and 123) is considered an indication of unreliability in at least one of the commands (122 and 123). The memory tests (122 and 123) are used to identify an unreliable one of the commands (122 and 123) that is from one of the SoCs (105 and 104) that fails the corresponding memory test (e.g., 124 or 125). Each of the memory tests (122 and 123) can be constructed and/or performed in a way similar to the memory test (123) of FIG. 2.

The command controller (107) is configured to discard the command (e.g., 122 or 123) corresponding to the SoC (e.g., 104 or 105) that fails the memory test (e.g., 124 or 125).

If there is one command (e.g., 123 or 122) that is not discarded after the memory tests (124 and 125), this remaining command (e.g., 123 or 122) is provided by the command controller (107) to the control element(s) (109) for execution, in a way similar to the command control (107) of FIG. 2 passing the command (123) to the command element(s) (109) in response to the SoC (105) passing the memory test (125) in FIG. 2.

Further, the command controller (107) may attempt to restore the redundant function of the faulty one of the SoCs (104 and 105) using the data from the healthy one of the SoCs (104 and 105) that passes the memory test (e.g., 124 or 125).

For example, the firmware (115) and/or the mission-critical data (119) stored in the memory (113) of the faulty SoC (105) may be moved to a different location within the memory (113) of the SoC (105). Since the memory (113) at the new location for storing the firmware (115) and/or the mission-critical data (119) may still function correctly, the error caused by the failed memory elements within the SoC (105) can be corrected. The faulty part of the memory (113), as identified by the result of the memory test (e.g., 125), may be blocked from further usage. The corrupted data in the faulty part of the memory (113) can be retrieved from the healthy one of the SoCs (e.g., 104) for repair. After restoring the firmware (115) and/or the mission-critical data (119) at a new location in the memory (113) of the SoC (105) that has faulty memory elements, the subsequent commands (122 and 123) generated by the SoCs (104 and 105) can be further compared to determine whether the repair is successful. For example, if the subsequent commands (122 and 123) generated by the SoCs (104 and 105) agree with each other, the redundant functions of the SoCs (104 and 105) can be considered to have been restored.

If, in a rare situation, both of the mismatching commands (122 and 123) are discarded after the memory tests (124 and 125), none of the command (e.g., 123 or 122) is provided to the control element(s) (109); and the command controller (107) may initiate a safe-mode command or an emergency response, in a way similar to the command control (107) of FIG. 2 responding to the blocking of the command (123) from reaching the control element (109) after the SoC (105) fails the memory test (125) in FIG. 2.

If, in a rare situation, none of the mismatching commands (122 and 123) is discarded after the memory tests (124 and 125), the command controller (107) may block both commands (e.g., 122 and 123) as a safety precaution and initiate the safe-mode command or an emergency response, in a way similar to the situation where both SoCs (104 and 105) fail the memory tests (124 and 125).

Alternatively, when none of the mismatching commands (122 and 123) is discarded after the memory tests (124 and 125), the command controller (107) may change or expand the scope of the memory tests (124 and 125); and the memory tests (124 and 125) can be adjusted repeatedly until at least one of the SoCs (104 or 105) fails its test (e.g., 124 or 125) or all of the memories of the SoCs (104 or 105) are found to be functioning properly. In some instances, the command controller (107) may optionally further test the processor(s) (e.g., 111) of the SoCs (104 and 105) within a predetermined time period that is safe for autonomous driving. For example, the command controller (107) may request each of the SoCs (104 and 105) to run a self-diagnosis to determine an unreliable one of the SoCs (104 and 105). For example, the command controller (107) may provide sample data as a replacement of the input data (121) to obtain the commands (122 and 123) can comparing the commands with the expected command associated with the sample data. A SoC (104 or 105) that produces a command (122 or 123) from the sample data that does not agree with the expected command is identified as a malfunctioning component.

Figure 7:
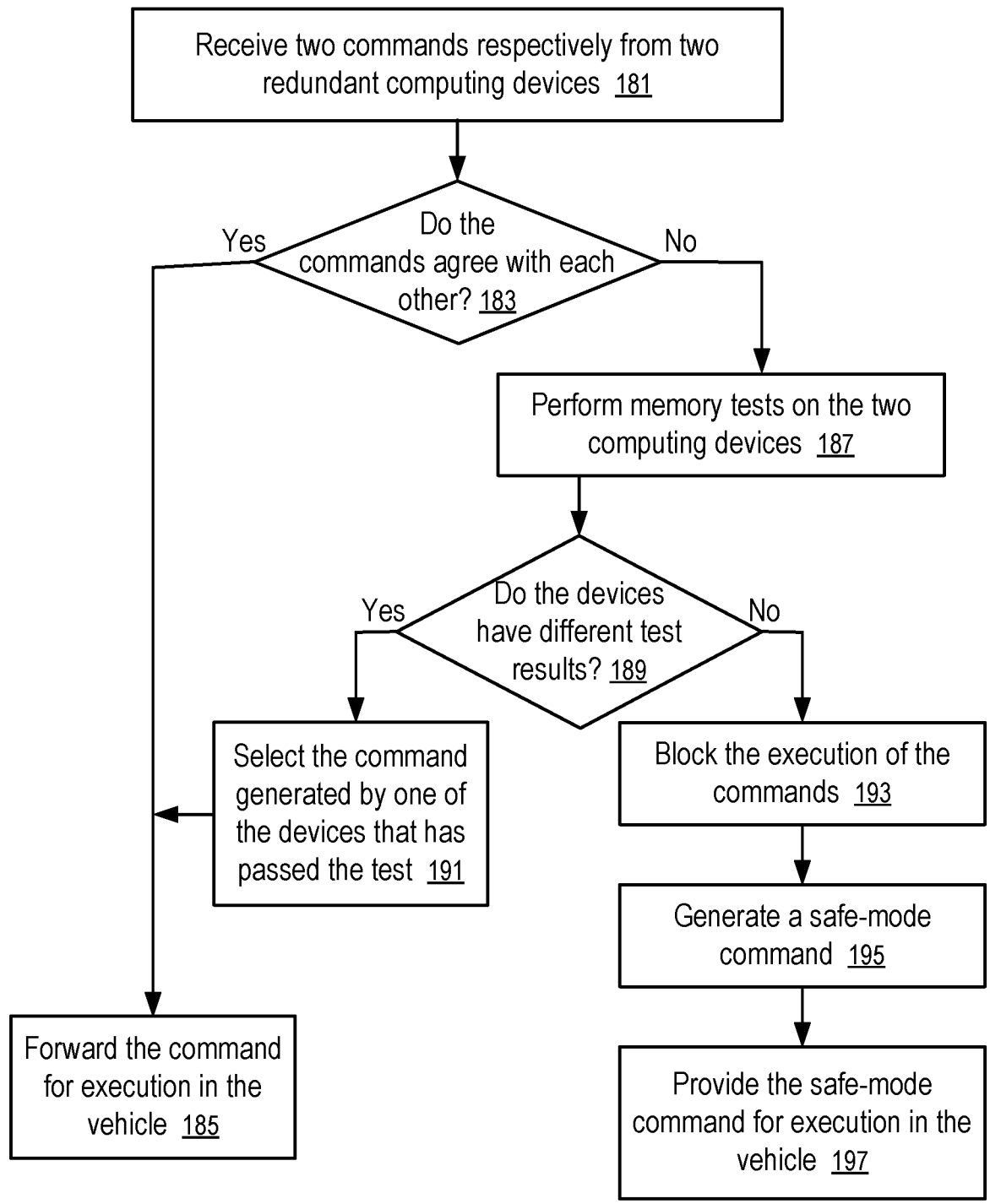
FIG. 7 shows a method to process redundant commands for a vehicle according to one embodiment.

FIG. 7 shows a method to process redundant commands for a vehicle according to one embodiment. For example, the method of FIG. 7 can be implemented in the vehicle (101) of FIG. 5 to perform operations illustrated in FIG. 6.

The method of FIG. 7 includes: receiving (181) two commands (122 and 123) respectively from two redundant computing devices (such as SoCs (104 and 105)); determining (183) whether the commands (122 and 123) received from the redundant computing devices (104 and 105) agree with each other; and if so, forwarding (185) any of the commands (122 and 123) for execution in the vehicle (101).

If it is determined (183) that the commands (122 and 123) do not agree with each other, the method of FIG. 7 further includes: performing (187) memory tests (124 and 125) on the two computing devices (104 and 105); determining (189) whether the computing devices (104 and 105) have different test results; if so (e.g., one passes the memory tests (e.g., 124 or 125) and other fails the memory test (e.g., 125 or 124)), selecting (191) the command (e.g., 122 or 123) generated by one of the computing devices (104 and 105) that has passed the memory test (e.g., 124 or 125); and forwarding (185) the selected command (e.g., 122 or 123) generated by the computing device (e.g., 104 or 105) that has passed the memory test (e.g., 124 or 125) for execution in the vehicle (101).

If it is determined (189) that the computing devices (104 and 105) have the same test result (e.g., both pass the memory tests (124 and 125) or both fail the memory test (124 and 125)), the method of FIG. 7 further includes: blocking (193) the execution of the commands (122 and 123); generating (195) a safe-mode command; providing (197) the safe-mode command for execution in the vehicle (101) (e.g., in a way similar to the corresponding operations (149, 151 and 153) of FIG. 3).

Figure 8:
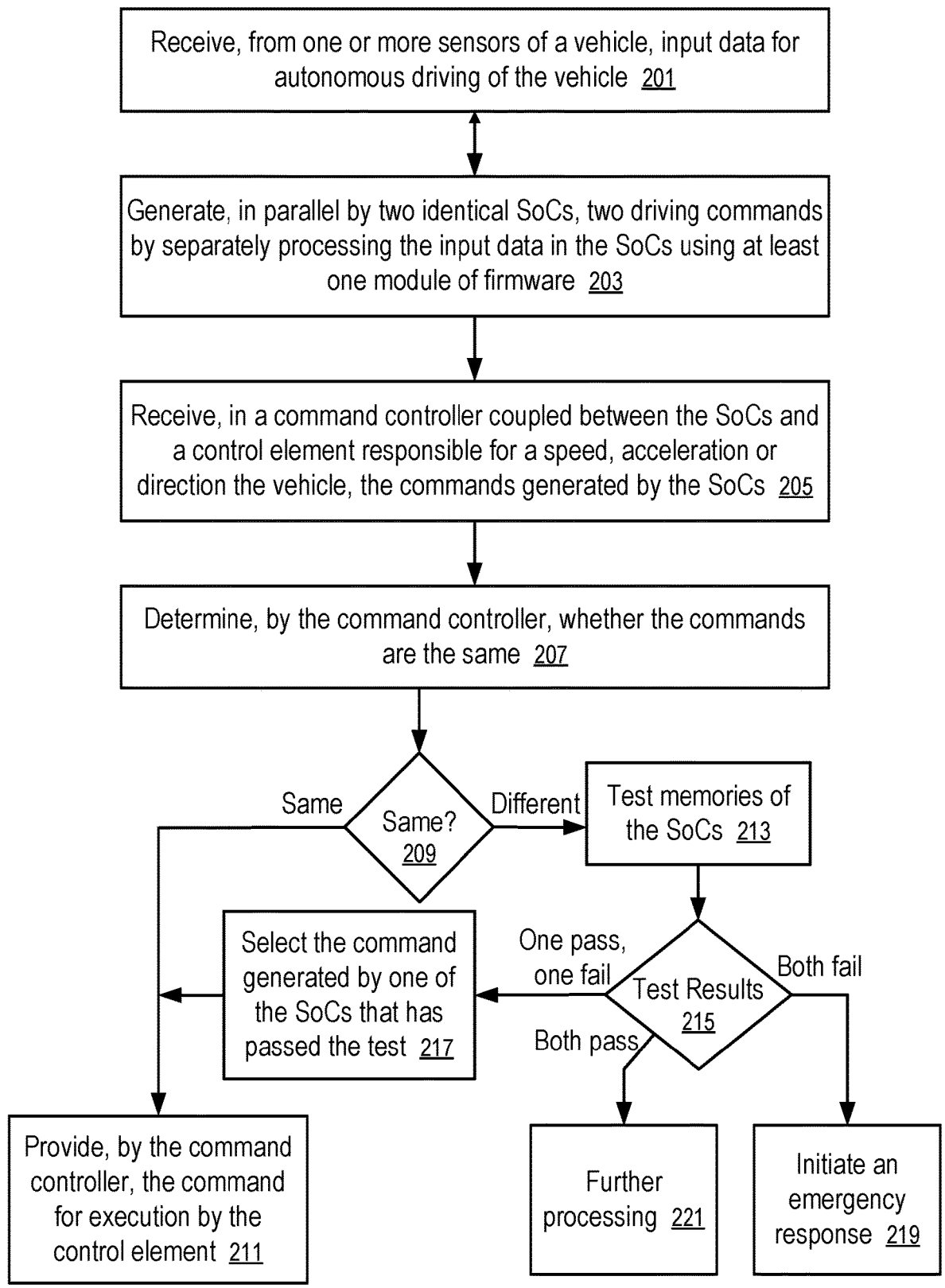
FIG. 8 shows a detailed method to enhance the reliability of a vehicle having redundant autonomous driving functions according to one embodiment.

FIG. 8 shows a detailed method to enhance the reliability of a vehicle having redundant autonomous driving functions according to one embodiment. For example, the method of FIG. 8 can be implemented in the vehicle (101) of FIG. 5 to perform operations illustrated in FIG. 6.

The method of FIG. 8 includes: receiving (201), from one or more sensors (103) of a vehicle (101), input data for autonomous driving of the vehicle (101); generating (203), in parallel by two identical SoCs (104 and 105), two driving commands (122 and 123) by separately processing the input data (121) in the SoCs (104 and 105) using at least one module of firmware (115) and mission-critical data (119) stored in the SoCs (104 and 105); receiving (205), in a command controller (107) coupled between the SoCs (104 and 105) and a control element (109) responsible for a speed, acceleration or direction the vehicle (101) (e.g., an accelerator, a brake, or a steering mechanism of the vehicle (101)), the commands (122 and 123) generated by the SoCs (104 and 105); determining (207), by the command controller (107), whether the commands (122 and 123) are the same; and if (209) the commands (122 and 123) are the same, providing (211), by the command controller (107), the command (122 or 123) from any of the SoCs (104 and 105) for execution by the control element (109).

If (209) the commands (122 and 123) are different, the method of FIG. 8 further includes: testing (213) memories (e.g., 113) of the SoCs (104 and 105); and making (215) a decision based on the test results.

If (215) one of the memory tests (124 and 125) has a result of pass and the one of the memory tests (124 and 125) has a result of fail, the method of FIG. 8 further includes: selecting (217) the command generated by one of the SoCs (e.g., 104 or 105) that has passed the memory test (e.g., 124 or 125); and providing (211), by the command controller (107), the command (122 or 123) from the SoC (e.g., 104 or 105) that has passed the memory test (e.g., 124 or 125) for execution by the control element (109).

Optionally, the data stored in the healthy SoC (e.g., 104) that has passed the memory test (124) is copied into the memory (113) of the unhealthy SoC (e.g., 105) that has failed the memory test (125) to repair the unhealthy SoC (e.g., 105). The data is copied into an alternative area of the memory (113) of the unhealthy SoC (e.g., 105), different from the tested area that has failed the memory test (125), to replace the corrupted data previously stored in the tested area of the unhealthy SoC (e.g., 105). Thus, if the damage in the unhealthy SoC (e.g., 105) is limited to the data corruption in the tested area of the unhealthy SoC (e.g., 105), copying data from the healthy SoC (e.g., 104) into an alternative area of the memory (113) of the unhealthy SoC (e.g., 105) can restore the function of the unhealthy SoC (e.g., 105). Whether or not the function of the unhealthy SoC (e.g., 105) is successfully restoration can be examined via comparing the subsequent commands from the SoCs (104 and 105). If the subsequent commands from the different SoCs (104 and 105) match with each other, the restoration is successfully.

If (215) both the memory tests (124 and 125) have the result of fail, the method of FIG. 8 further includes: initiating (219) an emergency response, in a way similar to the operations (175 and 177) of FIG. 4.

If (215) both the memory tests (124 and 125) have the result of pass, the method of FIG. 8 further includes: performing (221) further processing, such as expanding the memory tests (124, 125), testing the processors of the SoCs (105), requesting self-diagnosis of the SoCs (104 and 105), blocking the mismatched commands (122 and 123), and/or initiating an emergency response similar to the operations (175 and 177) of FIG. 4.

The present disclosure includes methods and apparatuses which perform these methods, including data processing systems which perform these methods, and computer readable media containing instructions which when executed on data processing systems cause the systems to perform these methods.

The SoC (105), the command controller (107) and/or the computer system for the autonomous driving of the vehicle (101) can be implemented as one or more data processing systems.

A typical data processing system may include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
receiving, in a command controller of a vehicle, two commands respectively from two computing devices configured on the vehicle;
determining, by the command controller, whether the two commands match; and
testing portions of memories of the respective computing devices, in response to a determination that the two commands do not match.

2. The method of claim 1, further comprising:
in response to the determination that the two commands match, forwarding by the command controller one of the two commands for execution via a control element of the vehicle.

3. The method of claim 1, further comprising:
in response to the determination that the two commands do not match with each other, determining whether results of the tests match with each other.

4. The method of claim 3, further comprising, in response to a determination that the results of the tests do not match with each other:
selecting a first command from the two commands based on the results of the tests; and
forwarding by the command controller the first command for execution via a control element of the vehicle.

5. The method of claim 4, further comprising, in response to a determination that the results of the tests do not match with each other:
discarding a second command of the two commands, the second command being different from the first command.

6. The method of claim 5, wherein the results of the tests indicate that a first one of the two computing devices passes a test and a second one of the two computing devices fails a test.

7. The method of claim 6, further comprising:
copying content from a portion of a memory of the first one of the two computing devices to a portion of a memory of the second one of the two computing devices.

8. The method of claim 6, further comprising, in response to a determination that the results of the tests match with each other, performing one of:
discarding the two commands when both of the two computing devices fail the tests; and
performing further processing to identify a faulty one of the two computing devices when both of the two computing devices pass tests.

9. The method of claim 8, wherein the further processing includes memory tests of adjusted scopes.

10. The method of claim 9, wherein the further processing includes testing one or more processors of the computing devices.

11. The method of claim 8, further comprising, when both of the two computing devices fail the tests:
generating a replacement command as a substitute of the two commands.

12. The method of claim 11, wherein the replacement command is configured to perform at least one of:
starting a preprogrammed emergency response routine to place the vehicle in a safe condition; and
reducing the speed of the vehicle for a stop.

13. The method of claim 1, further comprising:
receiving input data from at least one sensor configured on the vehicle, wherein the two commands are generated independently by two computing devices in parallel from the input data.

14. The method of claim 13, wherein the at least one sensor includes at least one of:
- a camera;
- an infrared camera;
- a sonar;
- a radar; and
- a lidar;

wherein the two computing devices generate two commands for autonomous driving of the vehicle; and wherein the operations of the control element control at least one of:
- acceleration of the vehicle;
- speed of the vehicle; and
- direction of the vehicle.

15. A vehicle, comprising:
a command controller coupled to a control element, wherein in response to receiving two commands from two computing devices, the command controller:
- determines whether the two commands match with each other; and
- initiates memory test on the two computing devices in response to a determination that the two commands do not match.

16. The vehicle of claim 15, wherein each of the two computing devices are sealed in one integrated circuit package for a system on chip; and the command controller is external to the system on chip.

17. The vehicle of claim 15, further comprising:
at least one sensor to generate input data for at least one of the computing devices, wherein the respective computing device generates the command based on the input data.

18. The vehicle of claim 17, wherein the at least one sensor includes at least one of:
- a camera;
- an infrared camera;
- a sonar;
- a radar; and
- a lidar.

19. The vehicle of claim 17, wherein the one of the two commands received for execution causes the control element to adjust at least one of:
- acceleration of the vehicle;
- speed of the vehicle; and
- direction of the vehicle.

20. A non-transitory computer storage medium storing instructions which when executed by a controller of a vehicle causes the controller to perform a method, the method comprising:
- receiving two commands respectively from two computing devices configured on the vehicle, the two commands configured to adjust operations of the vehicle;
- determining whether the two commands match;
- testing portions of memories of the respective computing devices in response to a determination that the two commands do not match; and
- skipping the testing in response to a determination that the two commands match.

* * * * *